Figure 16:
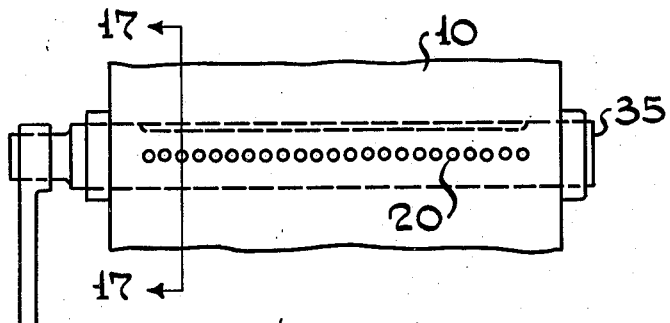

Nov. 15, 1949   C. C. WADDELL ET AL   2,487,910
EXTRUSION EQUIPMENT
Filed Jan. 19, 1946   5 Sheets-Sheet 1
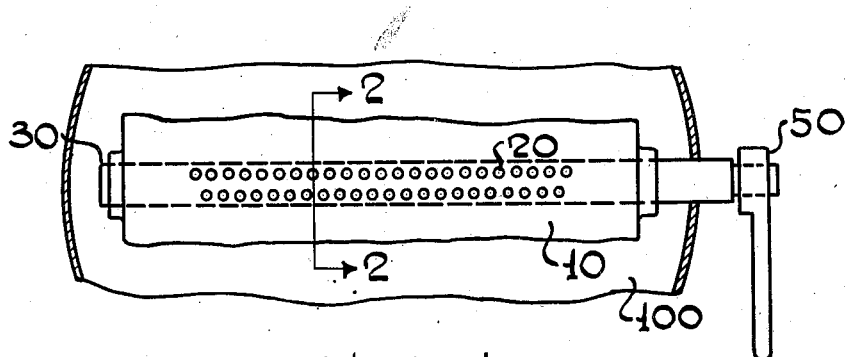
Fig.-1
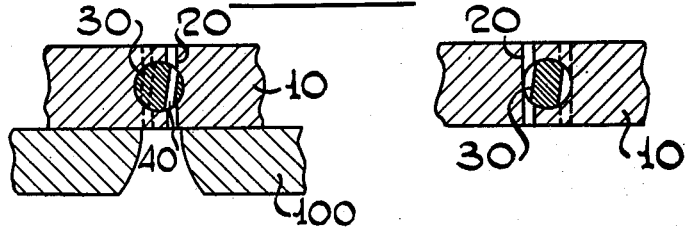
Fig.-2    Fig.-3
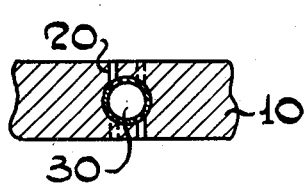 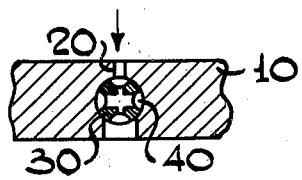
Fig.-4    Fig.-5
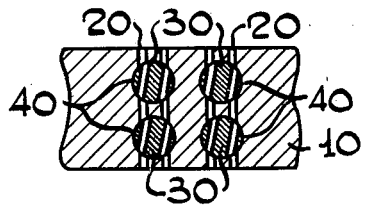 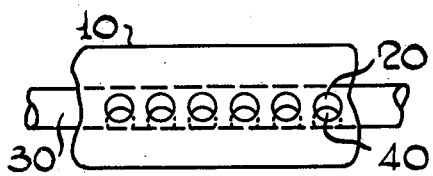
Fig.-6    Fig.-7
Clarence C. Waddell
Herbert H. Vickers   Inventors
Wendell W. Waterman
By _____ Attorney

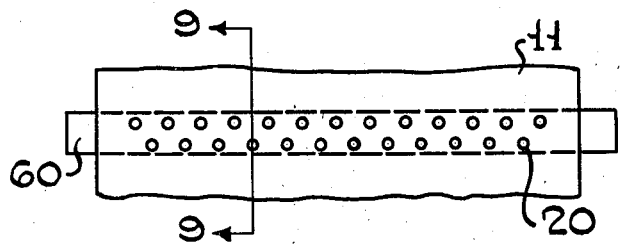
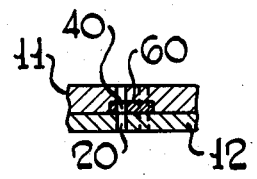
FIG.-8  FIG.-9
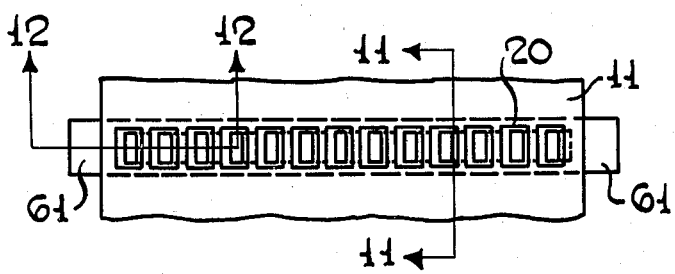
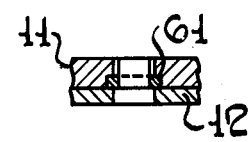
FIG.-10  FIG.-11
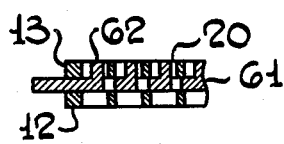
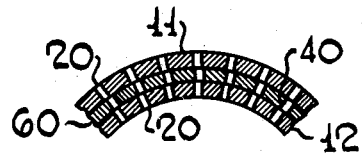
FIG.-12  FIG.-13
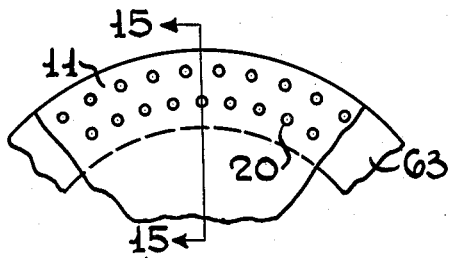
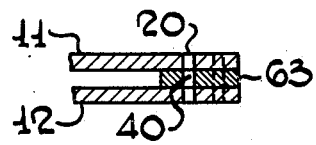
FIG.-14  FIG.-15
Clarence C. Waddell
Herbert H. Vickers  Inventors
Wendell W. Waterman
By *J.C. Small* Attorney Nov. 15, 1949 C. C. WADDELL ET AL 2,487,910
EXTRUSION EQUIPMENT
Filed Jan. 19, 1946 5 Sheets-Sheet 3

Clarence C. Waddell
Herbert H. Vickers   Inventors
Wendell W. Waterman

By J. C. Amall Attorney

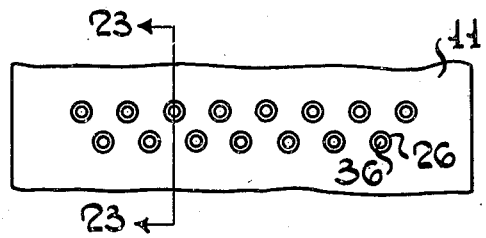
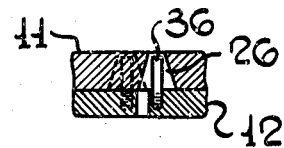
FIG.-22  FIG.-23
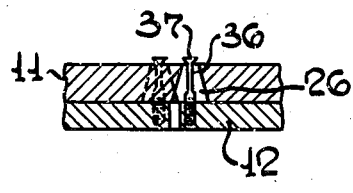
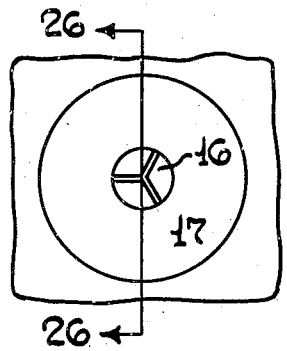
FIG.-24  FIG.-25
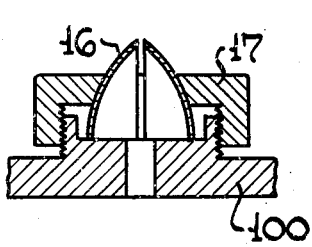
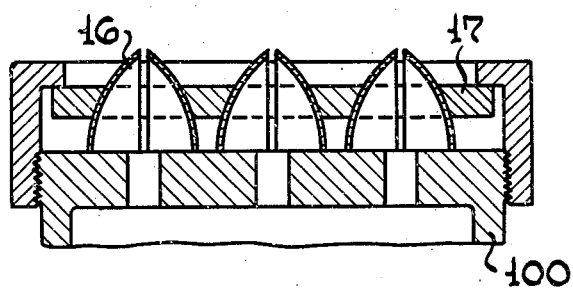
FIG.-26  FIG.-27

Patented Nov. 15, 1949

2,487,910

UNITED STATES PATENT OFFICE 2,487,910

EXTRUSION EQUIPMENT

Clarence C. Waddell, Aruba, Netherland West Indies, and Herbert H. Vickers, Union, and Wendell W. Waterman, Cranford, N. J., assignors to Standard Oil Development Company, a corporation of Delaware Application January 19, 1946, Serial No. 642,398

4 Claims. (Cl. 18—12)

This invention relates to extrusion and plasticizing equipment, and in particular to the improvement in such equipment by the use of adjustable die plates.

Extruding equipment is employed in processing materials either for (1) forming or shaping materials for the preparation of threads, strips, films, tubes, etc., or (2) effecting a mastication, mixing, heating, compacting or physical breakdown of the material. In both cases pressure is employed to force the material in a plastic state through a die. In the first case the amount of physical work employed is that required to force the material through the die in order to obtain a suitably shaped product; other effects are purely incidental. In the second case work is applied to subject the material to friction and shearing and to develop within the material internal friction effects, thus bringing about the desired mastication, mixing, heating or plasticizing, the shape of the stock leaving the die being of little importance. In cases in which ultimate shape is important, a subsequent shaping operation may be carried out.

Extrusion for physical working of the stock involves the passing of the material through arrangements of one form or another to restrain the free forward flow of the stock under pressure. This treatment is usually obtained by passing the material either through fine clearances within the machine or through restricted apertures in the discharge. With extruder stocks of different character, the resistance to flow has to be changed to provide means for effecting a desired degree of processing. The present invention relates to a means by which variation in extrusion conditions of rubber and plastic materials can be effected without interruption of the continuous flow of the stock through the equipment or a dismantling of parts of the apparatus as generally necessitated by prior art equipment.

The invention has as one of its objects to provide an improved means by which variable rubber and plastic materials may be satisfactorily extruded without interrupting continuous processing and without dismantling any parts of the extrusion equipment.

Another object of the invention is to provide a ready means whereby adjustment and improved flexibility in the extrusion of variable rubber and plastic stocks may be had by varying the resistance to flow at the extruder discharge.

Another object of the invention is to provide improved means for varying the available aperture or apertures in extrusion equipment for the processing of rubber and plastic stocks, thereby permitting desired degrees of processing not hitherto obtainable without interruption of continuous processing or the dismantling of extruder parts.

Another object of the invention is to provide means of easily varying the resistance at the discharge end of extrusion equipment in order to control, at a constant feed rate, the degree of plasticity, the discharge temperature, or other treatment of the stock.

Another object of the invention is to provide convenient means for varying the resistance at the extruder discharge in order to handle fluctuations in the feed rate without having to vary the uniformity of the treatment being given to the stock.

These, and other, objects may be judged as features of the invention by the description and illustration as further presented.

In the preparation, for example, of butyl rubber, an extrusion step is employed and control of the degree of mastication by the process of this invention is very advantageous. Butyl rubber is prepared by the interpolymerization of an isoolefin such as isobutylene with one or more polyolefins such as butadiene, isoprene, piperylene, dimethylbutadiene and the like, at temperatures as low as —160° F. The mixture of polymer and unreacted monomers from the reaction system is transferred to a flashing zone in which the greater proportion of the volatile materials accompanying the polymer is removed. The polymer is then dispersed in water to form an aqueous slurry at a temperature of about 150° F. The slurry is then passed into a stripping zone in which residual volatile materials are removed by the direct admixture with steam. The resultant slurry is then passed to screening or filtering equipment to remove the bulk of the aqueous solution, leaving the polymeric material in the form of wet crumbs. This crumb material may be further dewatered by pressing operations, and then, if necessary, broken up by shredding or disintegrating equipment to prepare the stock in suitable form for drying. The dewatered crumbs are then distributed evenly over a perforated plate conveyor and conducted through a heated zone in which nearly all of the moisture is removed by evaporation. With materials such as butyl rubber, exposure of the stock to elevated temperature in this drying operation tends to result in a coalescence of the crumbs to form a blanket at the drier discharge. It is the practice to pass the blanket through shredding or cutting equipment in order to obtain suitable sizing of the material for subsequent operations.

The stock is then extruded in order to (1) compact and mix it; (2) heat the stock above the minimum temperature required for subsequent milling operations; (3) raise the temperature sufficiently to cause the substantial elimination of remaining moisture by vaporization; (4) strain the stock through a small mesh screen to remove any foreign solid materials, and (5) work the stock mechanically, in certain cases, in the presence of a substance such as xylyl mercaptan to break down the molecular weight of the material and thereby reduce its Mooney viscosity. When stocks of high molecular weight are thus chemically plasticized, the mercaptan dissolved in a suitable hydrocarbon liquid is added to the extruder hopper at a rate depending upon the throughput of the feed and its average molecular weight.

After the extrusion operation, the stock is either transferred directly to cooling and packaging operations or is further mechanically worked in a batch or continuous milling operation. The preferred treatment after extrusion is, however, to pass the stock continuously over two mills in series. The first mill purposes to effect the complete removal of air and traces of moisture present as vapor bubbles, while the second mill effects the continuous discharge of a strip of uniform width and thickness suitable for cooling and cutting into convenient lengths for packaging.

In all such processing of butyl rubber, extrusion is thus an important factor in obtaining the desired results. The effects, however, of a number of interrelated variables have to be considered. These variables affect the extrusion characteristics of the butyl rubber stocks and therefore determine operating requirements of the extrusion equipment. A variation in the Mooney viscosity, for example, not only changes the capacity of the extruder under a given set of operating conditions but also tends to raise or lower the temperature level to which the stock must be preheated as a result of passing through the extruder. This preheating of the stock has been found a necessary prerequisite of milling due to the existence of a critical temperature below which a satisfactory "band" on the mills cannot be obtained. The formation of a desirable "band" is dependent upon the stock being at a temperature at which it has such properties of adhesion and cohesion, particularly as to relationship between its elasticity and its plastic flow properties, that it will form a tight, relatively uniform sheet on the mill. For stocks having a Mooney viscosity in the neighborhood of approximately 50 at 212° F., as measured on the Mooney viscosimeter, the critical banding temperature is in the neighborhood of 280° F. For stocks of 75 to 85 Mooney viscosity at 212° F., the critical temperature may be above 340° F.

Stocks of different Mooney viscosities have also been found to require different conditions in the drying step prior to extrusion, and at the drier discharge such materials contain different amounts of residual moisture. Materials of 25 to 45 Mooney viscosity at 212° F. ordinarily exhibit a tendency to flow together or coalesce at the temperatures of about 275° F. to 325° F. commonly employed for drying. This tends to result in occlusion of moisture, decreases the permeability of the bed of material, thereby reducing the flow of air through the stock, and in some cases leads to the formation of a thin, gummy skin on the surface of the bed. When this latter condition prevails, the material beneath the skin tends to remain in the form of wet crumbs except for the occasional formation of a second thin skin next to the drier conveyor. In most cases, such stocks can be only incompletely dried by exposure to a hot air stream, residual moisture contents commonly ranging from ½ to 3½%. The presence of loose wet crumbs from the center part of the bed of rubber material has a marked effect upon the capacity of extrusion equipment since the moisture tends to lubricate the inside of the barrel of the extruder and since such fragmentary disconnected particles are not as readily drawn from the hopper section as are compact coherent rubber masses. On the other hand, materials of 55 to 85 Mooney viscosity at 212° F. ordinarily are much less subject to flow and coalescence and can usually be air-dried at high capacity to 0.5% or less residual moisture.

In addition, extreme variations in the particle size and type of the polymer in the original slurry tend to induce variations in characteristics of material fed to the extruder. For example, under certain conditions large lumps ranging from ½" to ¾" in diameter may be encountered. Such particles readily lose surface moisture in the drying operation but leave occluded moisture difficult to remove. Such lumpy stocks are usually difficult to extrude at high capacity. Differences in extrusion characteristics also appear to result from variations in unsaturation of the product, content of additives such as zinc stearate, etc.

When high Mooney viscosity butyl rubber is plasticized chemically, the stock temperature at the extruder discharge has been found to be critical with respect to the amount of mercaptan required to effect a given viscosity reduction, or conversely, adjustment of extrusion conditions is important in order to control the amount of breakdown obtained with a given mercaptan addition.

Such variations in moisture content, in physical form of the dried material fed to the extruder, whether due to Mooney variations or other causes, and also fluctuations in feed rate to the extruder equipment, require drastic changes in extrusion conditions if satisfactory extruder capacity is to be maintained. The use in extrusion equipment of die plates designed according to the invention permits desirable processing of all such variable butyl rubber stocks. The invention, however, has wider application than to this particular stock, the processing of butyl rubber being taken merely for illustration purposes.

In the prior art, variations in the feed stock to the extruder, such as those previously discussed, were handled either by varying the rotational speed of the screw in the extruder or by changing the die plate. Changing the speed of the screw alone is not sufficient, in most cases, to allow for the range of variations normally encountered. With prior art equipment, for example, it was necessary to take the machine out of service and replace the die plate with another having a different resistance in order to be able to change the resistance at the extruder discharge. However, in cases such as that of butyl rubber manufacture, the quality of the feed stocks to the extruder may vary, particularly in the continuous processing of a product from a single reactor, due to conditions in the reaction system difficult to control.

Also in most cases the rate at which material must be fed to the equipment is not at the control of the extruder operator but is determined by the earlier steps in the process. For this reason, the effective capacity of the extruder under the desired operating conditions must be maintained in spite of adjustments made for purposes of controlling the degree of mastication, etc. In the prior art, most methods of overcoming this difficulty gave a step adjustment which was inadequate for the close control required.

Furthermore, in continuous operation as previously described, interruptions in the extruder operation for dismantling the die plate and installing a different size die disrupt the entire train of operations. It has therefore been desirable for some time to have facilities over those available in the prior art for extruding such variable synthetic rubber and plastic stocks as butyl rubber. This invention relates essentially to the use of a die plate of adjustable resistance, either alone or in combination with prior art methods, in the extrusion of rubber and plastic materials.

The invention is therefore primarily concerned with a readily adjustable die plate for screw type extrusion equipment employed in the processing of rubber and plastic type materials. The die plate designed according to the invention consists of at least two parts, one movable with respect to the other so as to permit, by external control, restriction of the aperture or clearance through which the material is to be extruded. The constricted passageway for the stock may be made either by surface or axial constriction of the aperture or apertures in one or both of the essential parts.

The design of this adjustable die plate is in contrast to the extruder die plates proposed in the prior art wherein die plates having a fixed number of holes of some specific size or a slot or other fixed aperture or apertures have been considered. In both cases, therefore, plates having a number of apertures for greater friction or shear surface are proposed. In this case, however, the greater range afforded, not only of the number of apertures but also of the sizes and shape, increases considerably the shear and friction surfaces for the material undergoing extrusion. Also, when two series of apertures are made in the moving part or parts of the assembly, the series of larger holes may be used to permit of a greater range of plate capacity and a greater facility for purging of the plate. Also, in the case in which the apertured moving part is a hollow cylinder having small holes, the assembly permits improved mixing of the streams during extrusion.

Constriction of the aperture or apertures of the die plate assembly in the surface manner may be effected by the relative angular or linear movement of the surfaces of similarly perforated plates from unobstruction to complete obstruction of the passageway or passageways through the plates in combination functioning as the die plate. Another manner of constriction of the apertures may be the rotation within an apertured plate of a similarly apertured spindle to permit free or obstructed clearance through the apertured portion of the combination. Also the constriction of the die plate assembly may be effected by the aperture or apertures in one plate being reduced in cross-section by the movement of the second element as a cam over one or both of the surfaces of the first element. The constriction in the axial direction may be effected by the movement of screw or worm elements within the apertured portion of the die plate assembly so as to reduce the assembly opening in the combination of the parts. Furthermore, the adjustable die plate may be easily cleaned or purged by making the adjustment for unobstructed passageways through the plate assembly and permitting any obstructed material to pass through the plate assembly.

The external control means for making the adjustments of the size and shape of the aperture in the die plate assembly may be any of the common means of attachment of the essential die plate parts to gears, levers and springs for convenience of operation.

The use of adjustable die plates of this invention permits a greater or lesser in-put of mechanical energy into the material undergoing extrusion, or, in other words, the absorption in the material of a greater or lesser amount of energy from the driving machinery by reason of the variation in resistance to flow of the material at the extruder discharge. In this connection, changes in the die plate assembly are made in consonance or in accordance with effects upon the material to be extruded so as to achieve the desired processing results. The energy transmitted to the stock at this point, in the case of butyl rubber for example, makes possible the preheating of the material to the necessary temperature for milling, vaporizes residual water and determines the effectiveness of mercaptan added to the materials undergoing chemical plasticization. It is the advantage of the adjustable die plate that control of these variables is established at the critical point in the processing of such stocks.

The invention will be further described and illustrated in regard to specific embodiments presented as examples and for purposes of specific illustrations of the invention. These embodiments of the invention are illustrated in the attached drawings. In these drawings—Figures 1 to 27, respectively—views are presented showing the construction and assembly of various types of adjustable die plates, similar numerals referring to similar parts.

In Figure 1, there is shown a die plate consisting of a metal block 10 with a large number of holes 20 made in the direction of flow of the material to be extruded from the extruder equipment, generally indicated by the reference numeral 100. Extending through the block 10, at right angles to the direction of flow and across the holes 20, is a closely fitting cylindrical spindle 30. This spindle is made with holes 40 in a matching pattern as in the block itself, as shown in Figure 2. The holes are spaced in the spindle in equal disposition about the axis of the spindle so as to be of equal length. The holes 40 in the spindle 30 may be aligned with the holes 20 in the block 10 when the spindle 30 is suitably fitted into the block 10. The holes 20 and 40 in this embodiment are of 3/8" diameter, and their similar type embodiments have holes of 1/16" to 1" diameter, but a preferred range is of 1/8" to 5/8" diameter. Thus, the assembly of the block 10 and the spindle 30, when the holes 20 and 40 are aligned, is equivalent to a simple die plate having straight-through holes. When the spindle 30 is rotated by the arm 50, each opening through the assembly is restricted at two points on the periphery of the spindle. Thus, the rotation of the arm 50 is the means by which the size of the hole through the assembly may be varied. Also, by control upon the movement of the arm 50, the size of the hole can be varied from that of the full size of the hole to zero, and thereby the resistance of extruded material through the assembly can be changed as desired.

The spindle 30 may be of solid construction except for the holes 40, as shown in Figure 2 (Figure 2 is a section along the line 2—2 of Figure 1). There may be more than one hole through the spindle cooperating with holes in the plate 10. In either case, however, the holes through the spindle are at right angles to the axis, pass through it, or are equi-distant from it as shown in spindle 30 in Figure 2. Also, the spindle may be segmented to permit passageway between the holes 20 in the plate 10 as shown with spindle 30 in Figure 3. The spindle may also be of hollow construction (30) as shown in Figure 4. Also, two series of different size holes as, for example, in one embodiment, of ⅜" and ¾" diameter, disposed at right angles to each other, may be made in the spindle 30 as shown in Figure 5, so as to permit a better control of die plate resistance over a wide range of throughput and greater facility for purging the plate or extruder through the larger series of holes. With a spindle of the hollow type, an advantage is attained over that of the solid type in providing a mixing and equalizing chamber between the points of constriction. Also, in the hollow type spindle the outlet holes may be offset from the inlet holes, thus contributing to a mixing, shearing and equalizing effect upon the material being forced through the spindle. Furthermore, when the die plates contain many small holes, a greater friction is obtained. In addition also, a greater mixing effect is attained as a result of the combining of the various streams.

Multi-cylinder die plates having spindles arranged in parallel may be employed in order to attain added capacity. Multi-cylinder die plates having spindles arranged in series may also be employed in order to attain added constriction. Multi-cylinder die plates having spindles arranged in parallel and series may also be employed in order to attain both added capacity and added constriction, as shown in Figure 6, similar in form to the types shown in Figures 2, 3, 4 and 5. In addition, die plates having spindles in series or in parallel may be employed. Furthermore, instead of round holes through the plate, slotted holes may be used. In this case, the long axis of the holes may be parallel, perpendicular, or arranged obliquely with respect to the axis of the respective spindles. Moreover, according to the invention, the spindle portion does not necessarily have to be made in a pattern to match the openings in the fixed portion 10 of the die plate assembly: Figure 7 shows a spindle machined in any way that will permit restriction of the opening upon rotation of the spindle.

A die plate having a multi-spindle arrangement may be used to cover the discharge opening of an extruder having any conventional size or shape of discharge outlet. For an extruder having a round opening, a die plate of this type would suitably consist of a solid metal disc portion 10 having a number of parallel cylinders of the type 30 extending therethrough perpendicular to the direction of flow of the extruded stock through the equipment 100. For an extruder equipped with a slabbing head having a slotted type opening, a rectangular block having possibly only one or two parallel spindles of the type of 30 would be satisfactory.

In Figures 8 to 27, additional embodiments of the invention are shown. The die plate assembly in the case of Figures 8 and 9 consists of two stationary metal plates 11 and 12, similarly apertured to that of the die plate 10 in Figure 1. One or both of the plates 11 and 12 may be slotted. The plates 11 and 12 and the bar 60 in this embodiment of the invention are made with a similar pattern of holes 20 and 40 or slots so that when clamped in position and properly aligned the perforations or holes, similar to the holes 20 and 40 in the embodiment shown in Figure 2, provide unobstructed passages for the material to be extruded. By moving slightly the cut-off bar or plate 60, constriction of the openings through the die plate assembly may be made, as desired, by movement in either of the two possible directions. Clearly, in place of round holes, openings of other shapes, such as slots, rectangles, etc., may be employed. In Figures 10, 11 and 12, plate 11 has rectangular holes 20 with a flush face cut-off to permit the insertion of a cut-off bar 61 which may be moved in a direction perpendicular to the flow of the extruded material through the equipment 100. In this latter type plate, sliding member 61 is provided with a projection 62 in each opening or aperture 20 extending through the outer member and flush with the surface on the discharge side of the plate. The design of the plate in this case is such as to give extrusions in the form of ribbons, the thickness of which may be adjusted by the movement of the cut-off bar or plate 61. Similar means with regard to round head extruders may be made, as in the case of all the embodiments illustrated in Figures 8 to 15, by making the plates in the form of discs, as shown in Figure 14, the cut-off bar 63 then being a disc which may be rotated to constrict the openings in the plates 11 and 12. This means may also be applied to a side discharge extruder or pelletizer by providing concentric cylinders with matching orifices as shown in Figure 13, one of which may be rotated about the other sufficiently to restrict the openings.

Figure 17:
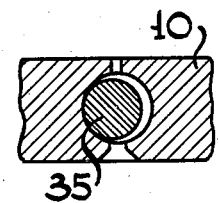

Another type of adjustable die plate is illustrated in Figures 16 and 17. In this case, as shown in Figure 16, the die plate assembly consists of a plate 10 provided with a cam type cylinder 35, the plate 10 being drilled with a large number of small holes 20. In this case, the section of the spindle extending across the perforations is smaller in diameter than the spindle proper and is eccentric to the axis of the spindle as shown in the cross-section Figure 17 taken along the lines 17—17 of Figure 16. The eccentric nature of the spindle permits its functioning as a cam, which upon rotation may be moved into position to restrict the discharge or inlet openings in the plate or plates of the type identified in Figure 1 by the reference numeral 10.

Figure 18:
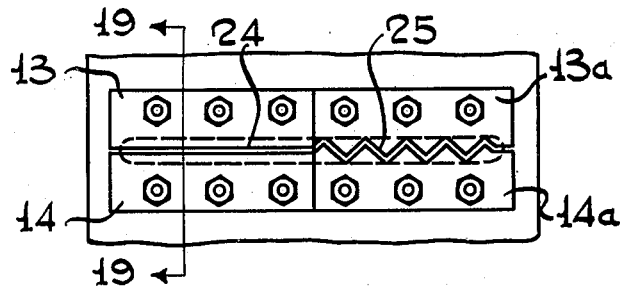
Figure 19:
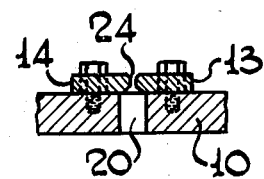

In Figures 18 and 19, die plate assemblies are shown. In Figures 18 and 19, two plates 13 and 14 are shown having slots of type 24 therein. Also shown in Figure 18, plates 13a and 14a show a zig-zag form of slot 25 as different from the elongated slot of plates 13 and 14. By the relative movement of the two plates, variations in the size of the slot may be easily made.

Figure 20:
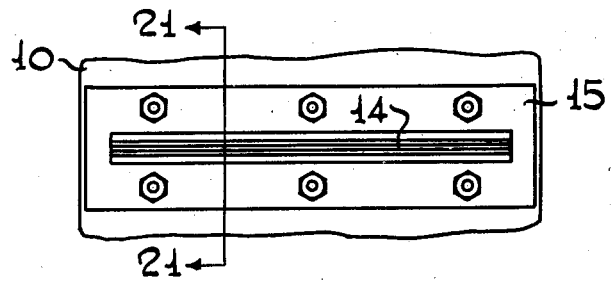
Figure 21:
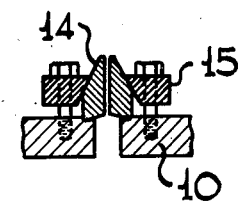

In Figures 20 and 21, another variation of the ribbon type die plate is shown. A pinching jaw combination 14 is moved by the wedge action of an adjustable plate 15.

In Figures 22 to 24, another type of adjustable die plate assembly is shown. In this assembly, the combination consists of two plates 11 and 12, the outside one of which (11) is drilled with a number of holes 26, each being provided with an adjustable center spindle 36, threaded into the other plate 12. The spindles 36, upon rotation, may be advanced or retracted by screwing in or out of the plate 12. The maximum restriction is obtained by advancing the spindle until the head of the spindle 36 is flush with the surface of the plate 11. In a further modification of this embodiment, the spindle 36 is equipped with a tapered head 37 outside of the plate 11, the restriction being adjusted by screwing the spindle into the member 12, thereby partially plugging the opening in the plate 11.

In Figures 25 to 27, die plates based upon the chuck type adjustment may be employed. In this case, a chuck mounted on the cylinder head 100 is used to constrict the apertures. The chucks consist of wedges 16 which may be moved in relation to each other by the wedge action of a movable plate 17.

Figure 28:
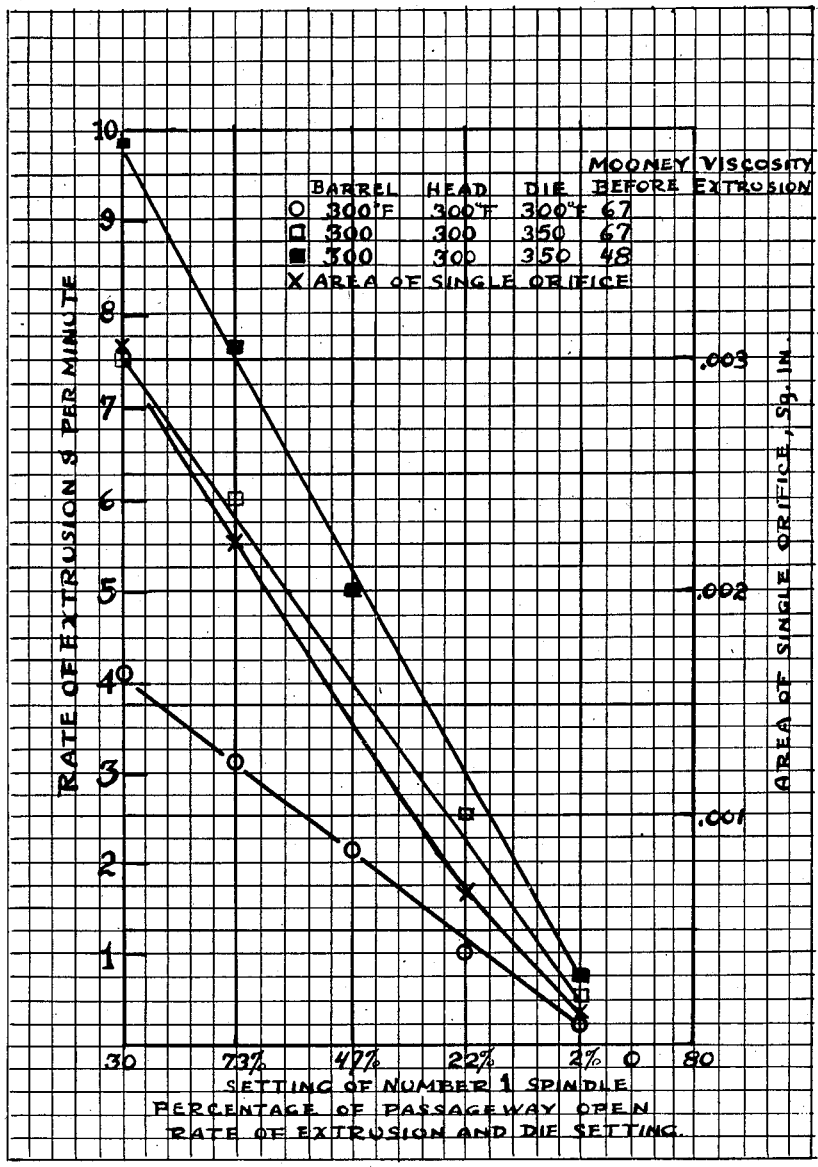

In an investigation of the rate of extrusion of butyl rubber stocks through settings of an experimental die plate consisting of a combination of block and hollow type spindle, data at various temperatures were obtained and plotted as shown in Figure 28. Comparison of the graphs in Figure 28 indicates that when the temperature of the barrel or body of the extruder is 300° F., the rate of extrusion is proportional to the area of the passageway. Furthermore, in the chemical plasticization of a high Mooney viscosity stock by passage through two hollow spindles in series, comparison of the data in the following table indicates that reducing the passageway through the die plate increases the amount of resistance and gives a greater reduction in Mooney viscosity.

[Original polymer—78 Mooney viscosity. Plasticizer—0.02% xylyl mercaptan. Extruder temperatures: body—110° F.; die plate—400° F.]

| Percent Available Opening | | Extrusion Rate, g. per minute | Mooney Viscosity After Extrusion and 10 minute Milling [1] at 300° F. |
|---|---|---|---|
| #1 Spindle | #2 Spindle | | |
| 100 | 100 | 7.4 | 67 |
| 73 | 73 | 7.1 | 66 |
| 47 | 47 | 6.0 | 63 |
| 22 | 22 | 4.8 | 63 |
| 2 | 2 | 3.2 | 62 |

[1] The 10-minute hot milling treatment eliminates residual mercaptan activity in the extruded material.

Also, it has been found that in the extrusion of a sample of butyl rubber with 0.02% xylyl mercaptan, the stock was plasticized at full passageway opening with a reduction of Mooney viscosity from 67 to 50; while closing the passageway through the die plate to 40% available opening, only 0.01% xylyl mercaptan was necessary to give the same reduction in Mooney viscosity. In this connection, the data with regard to xylyl mercaptan is given merely as an illustration of an effect occurring with chemical plasticization agents of which xylyl mercaptan is typical.

What is claimed is:

1. Extrusion apparatus comprising a container for plastic material to be extruded under pressure, a die forming a part of the said container having a plurality of extrusion passageways extending outwardly from the inside of the container through the die to the external surface of the die, at least one interior passage extending through the interior of the die at right angles to the said extrusion passageways and intersecting each of the extrusion passageways, whereby extrusion channels are provided from the inside of the said container to the said external surface of the die consisting of: the portion of each extrusion passageway extending from the container to the said interior passage, the said interior passage itself, and the portion of each extrusion passageway extending from the said interior passage to the external surface of the die; and a movable member fitted in said interior passage adapted to variably obstruct the said extrusion channels upon movement thereof.

2. Apparatus according to claim 1 in which the said movable member is provided with a plurality of lateral passageways equal in number to the extrusion passageways extending through the die and normally in alignment therewith, said passageways in the movable member being adapted for lateral misalignment with the extrusion passageways through the die by movement of said movable member.

3. Apparatus according to claim 1 in which the said interior passage extending through the interior of the die is cylindrical, and the movable member is a spindle element fitted therein.

4. Extrusion apparatus comprising a container for plastic material to be extruded under pressure, a die forming part of the said container having a plurality of extrusion passageways extending outwardly from the inside of the container through the die to the external surface of the die, at least two interior passages extending through the interior of the die at right angles to the said extrusion passageways and intersecting each of the extrusion passageways whereby extrusion channels are provided from the inside of the said container to the said external surface of the die, and movable members fitted in said interior passages adapted to variably obstruct the said extrusion channels upon movement thereof.

CLARENCE C. WADDELL.
HERBERT H. VICKERS.
WENDELL W. WATERMAN.

REFERENCES CITED

The following references are of record in the file of this patent:

UNITED STATES PATENTS

| Number | Name | Date |
|---|---|---|
| 124,431 | Fuller | Mar. 12, 1872 |
| 642,813 | Cowen | Feb. 6, 1900 |
| 1,226,642 | Demovitsch | May 22, 1917 |
| 2,316,949 | Garvey | Apr. 20, 1943 |
| 2,319,859 | Hale | May 25, 1943 |
| 2,370,952 | Gordon | Mar. 6, 1945 |